United States Patent
Lee et al.

(10) Patent No.: US 7,435,784 B2
(45) Date of Patent: Oct. 14, 2008

(54) METHOD OF ETHYLENE POLYMERIZATION FOR PRODUCING PRODUCTS HAVING VARIOUS PROPERTIES WITH HIGH PRODUCTIVITY AND A TUBULAR REACTOR USED THEREFOR

(75) Inventors: Jin-Suk Lee, Seosan-si (KR); Byoung-Yong Chung, Seosan-si (KR); Myung-Jae Lee, Seosan-si (KR); Kun Lo, Seosan-si (KR)

(73) Assignee: Samsung Total Petrochemicals Co., Ltd., Daesanup, Seoshan-shi, Chungcheongnam Province (KR)

( * ) Notice: Subject to any disclaimer, the term of this patent is extended or adjusted under 35 U.S.C. 154(b) by 199 days.

(21) Appl. No.: 11/265,700

(22) Filed: Nov. 2, 2005

(65) Prior Publication Data

US 2006/0149004 A1    Jul. 6, 2006

(30) Foreign Application Priority Data

Nov. 19, 2004    (KR) .................... 10-2004-0095084

(51) Int. Cl.
   *C08F 2/00*     (2006.01)
   *B01J 19/24*    (2006.01)
   *C08F 10/02*    (2006.01)

(52) U.S. Cl. .............. 526/64; 526/86; 526/87; 526/918; 422/134

(58) Field of Classification Search .................... 526/64, 526/86, 87, 918; 422/134, 188
See application file for complete search history.

(56) References Cited

U.S. PATENT DOCUMENTS

| | | | | |
|---|---|---|---|---|
| 3,503,949 A | * | 3/1970 | Gaspari ........................ | 526/64 |
| 3,628,918 A | * | 12/1971 | Beals et al. .................. | 422/134 |
| 4,177,240 A | * | 12/1979 | Dal Bianco .................. | 422/115 |

* cited by examiner

*Primary Examiner*—Fred M Teskin
(74) *Attorney, Agent, or Firm*—Barlow, Josephs & Holmes, Ltd.

(57) ABSTRACT

A method for continuous ethylene polymerization under high pressure using a polymerization reaction zone comprises a primary reaction zone and a secondary reaction zone wherein the secondary reaction zone has a length of 1.5-6.5 times the length of the primary reaction zone and a cross-sectional area of 1.2-4 times the cross-sectional area of the primary reaction zone. Ethylene is fed continuously into the primary reaction zone at the starting point of the primary reaction zone. Low temperature initiator alone, or an initiator mixture containing mainly low temperature initiator is introduced into the primary reaction zone at the starting point of the primary reaction zone. Initiator alone or an initiator mixture is introduced into the secondary reaction zone at two or more different points of the secondary reaction zone. Ethylene polymer products of various physical properties are produced with high productivity, while the pressure drop is minimized.

17 Claims, 2 Drawing Sheets

METHOD OF ETHYLENE POLYMERIZATION FOR PRODUCING PRODUCTS HAVING VARIOUS PROPERTIES WITH HIGH PRODUCTIVITY AND A TUBULAR REACTOR USED THEREFOR

BACKGROUND OF THE INVENTION

The present invention relates to a method for ethylene polymerization for producing products of various physical properties with high productivity, and to a tubular reactor used therefor. Specifically, the present invention relates to a method for continuous type ethylene polymerization under high pressure using a polymerization reaction zone comprising a primary reaction zone and a secondary reaction zone according to the process sequence of the polymerization reaction, wherein the secondary reaction zone has the length of 1.5-6.5 times as long as the length of the primary reaction zone and the cross-sectional area of 1.2-4 times as large as the cross-sectional area of the primary reaction zone, and wherein ethylene is fed continuously into the primary reaction zone at the starting point of the primary reaction zone, low temperature initiator alone or initiator mixture containing mainly low temperature initiator is introduced into the primary reaction zone at the starting point of the primary reaction zone, and initiator alone or initiator mixture is introduced into the secondary reaction zone at two or more different points of the secondary reaction zone, and relates to a tubular reactor used therefor.

Ethylene polymerization is a polymerization reaction conducted under the conditions of high temperature and high pressure, and the amount of ethylene polymers produced therefrom depends on the rate of feeding and conversion of the raw material, ethylene. Since the feed rate of ethylene is determined by the capacity of a compressor, in order to increase the feed rate of ethylene, the volume of the cylinder in the compressor should be expanded, which requires further consideration on the load applied to a motor. Therefore, the increase in ethylene polymer production by expanding the volume of the cylinder in the compressor has a limitation. Accordingly, when a compressor having a determined volume of cylinder is used, it can be said that the amount of ethylene production depends exclusively on the conversion rate. However, in the case of excessively raising the reaction temperature to increase the conversion rate, there is a risk of ethylene decomposition being explosively occurred, resulting in a halt of plant operation. In this aspect, the increase in conversion rate by simply raising the reaction temperature also has a limitation.

When preparing ethylene polymers, it should be essentially considered to maintain the physical properties of the resulted polymers to be suitable for a certain application as well as the increase in the conversion rate, since the resulted polymers must show various physical properties required according to the specific use thereof.

As described above, for making improvement in productivity of an ethylene polymerization process, it is essential to analyze a complex reaction system and understand and expect other general physical-chemical phenomena occurred in a reactor, and it is also essential to maintain physical properties of the resulted polymer to be suitable for the specific application. Accordingly, there has been a demand on development of a method for ethylene polymerization, which can provide high productivity, while maintaining various physical properties of the resulted polymer, and of a tubular reactor suitably used for the method.

SUMMARY OF THE INVENTION

Based on such needs, the object of the present invention is to provide a method for ethylene polymerization which can maintain physical properties of the resulted polymer products variously while showing high productivity and a tubular reactor used for the same method, by using a polymerization reaction zone in a continuous type ethylene polymerization method under high pressure, wherein the polymerization reaction zone is divided into two reaction zones, the primary reaction zone and the secondary reaction zone according to the process sequence of the polymerization reaction, and the length and cross-sectional area of the secondary reaction zone relative to those of the primary reaction zone are specifically determined, and the types of initiator and the number of times of introduction of the initiator is varied.

DETAILED DESCRIPTION OF THE INVENTION

Figure 1:
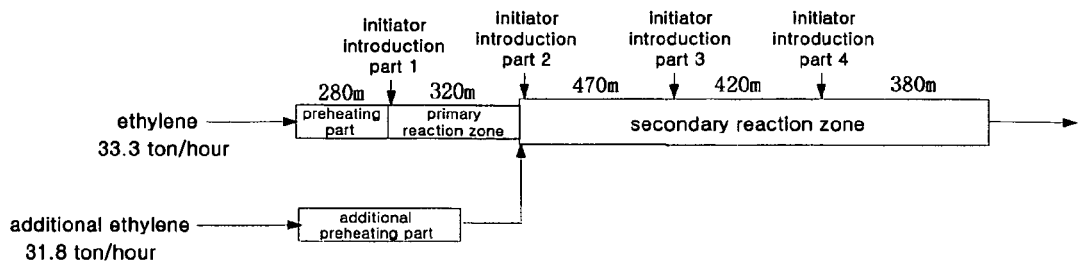
FIG. 1 is a schematic illustration of a tubular reactor used in Example 1 of the present invention.

The present invention provides a method for continuous type ethylene polymerization under high pressure using a polymerization reaction zone comprising a primary reaction zone and a secondary reaction zone according to the process sequence of the polymerization reaction, wherein the secondary reaction zone has the length of 1.5-6.5 times as long as the length of the primary reaction zone and the cross-sectional area of 1.2-4 times as large as the cross-sectional area of the primary reaction zone, and wherein ethylene is fed continuously into the primary reaction zone at the starting point of the primary reaction zone, low temperature initiator alone or initiator mixture containing mainly low temperature initiator is introduced into the primary reaction zone at the starting point of the primary reaction zone, and initiator alone or initiator mixture is introduced into the secondary reaction zone at two or more different points of the secondary reaction zone.

In the present invention, "polymerization reaction zone" means a region where a polymerization reaction is substantially conducted by an initiator.

In the present invention, "primary reaction zone" means a region where a polymerization reaction is firstly conducted, according to the process sequence of the polymerization reaction.

In the present invention, "secondary reaction zone" means a region where a polymerization reaction is conducted later the primary reaction zone, according to the process sequence of the polymerization reaction.

The method for ethylene polymerization according to the present invention is a method for continuous type ethylene polymerization under high pressure in which ethylene is polymerized in continuous polymerization reaction zone, wherein the polymerization reaction zone comprise a primary reaction zone and a secondary reaction zone according to the process sequence of the polymerization reaction.

In the method for ethylene polymerization of the present invention, the primary reaction zone in the polymerization reaction zone is present prior to the secondary reaction zone, according to the process sequence of polymerization reaction. The ethylene polymerization according to the present invention is started by feeding ethylene in continuous way and introducing a low temperature initiator alone or initiator mixture containing mainly low temperature initiator, into the primary reaction zone at the starting point of the primary reaction zone.

The low temperature initiator in the method for ethylene polymerization of the present invention is a compound which can initiate an ethylene polymerization reaction at relatively low temperature such as 140-160° C., including, for example, tert-butylperoxy pivalate, di-n-butylperoxy dicarbonate, tert-butylperoxy neodecanoate and the like. The low temperature initiator can be used alone or in the form of a mixture with other initiator(s) in the primary reaction zone. When the reaction initiating temperature of the low temperature initiator is lower than 140° C., the reaction proceeds too rapid to control the process. On the other hand, when the reaction initiating temperature is higher than 160° C., excessively large amount of energy is consumed for preheating of the reactants and the reaction efficiency decreases.

When the low temperature initiator is introduced in the form of a mixture with other initiators such as a mid-temperature initiator or a high temperature initiator, the mixture is preferred to comprise 50 mol % or more of the low temperature initiator. When the amount of the low temperature initiator is less than 50 mol %, the polymerization reaction in the primary reaction zone is not conducted smoothly. Further, the initiator mixture may comprise or not comprise oxygen, and the initiator mixture without oxygen is preferred in terms of stability in operation and process safety.

The mid-temperature initiator in the method for ethylene polymerization of the present invention is a compound which can initiate an ethylene polymerization reaction at relatively mid-temperature such as 160-190° C., including, for example, tert-butylperoxy 2-ethylhexanoate, tert-butylperoxy acetate, tert-butylperoxy benzoate and the like. When the reaction initiating temperature of the mid-temperature initiator is lower than 160° C., it becomes difficult to control the process. On the other hand, when the reaction initiating temperature of the mid-temperature initiator is higher than 190° C., reaction efficiency is decreased.

In the polymerization zone, the secondary reaction zone follows after the primary reaction zone, in the process sequence of the polymerization reaction.

The secondary reaction zone in the method for ethylene polymerization according to the present invention has the length of 1.5-6.5 times, preferably 3.5-4.5 times as long as the length of the primary reaction zone and the cross-sectional area of 1.2-4 times, preferably 1.5-2.5 times as large as the cross-sectional area of the primary reaction zone. In the method for ethylene polymerization of the present invention, the length of the primary reaction zone, where the reaction initiated by the low temperature initiator is mainly conducted, is reduced while the length of the secondary reaction zone is relatively extended, and the cross-sectional area of the secondary reaction zone is relatively enlarged compared to the cross-sectional area of the primary reaction zone, thereby the pressure drop (the range of pressure being reduced from the inlet to the outlet of the reactor) is occurred to an appropriate level and accordingly the retention time of reactants in the reactor becomes prolonged. Eventually, the conversion rate and accordingly productivity become improved in the present invention.

When the length of the secondary reaction zone is less than 1.5 times of the length of the primary reaction zone, it results in relative extension of the length of the primary reaction zone and thus the conversion rate in the whole reaction system becomes decreased. When the length of the secondary reaction zone is greater than 6.5 times of the length of the primary reaction zone, it will affect adversely to the physical properties of the resulted polymers. Further, when the cross-sectional area of the secondary reaction zone is less than 1.2 times of the cross-sectional area of the primary reaction zone, the secondary reaction zone becomes relatively narrow, causing failure in improvement of the productivity to a desired extent. On the other hand, when the cross-sectional area of the secondary reaction zone is greater than 4 times of that of the primary reaction zone, although productivity can become improved, it is not preferred since excessive pressure drop which may make the reaction unstable.

Further, in the present invention, in order to prevent excessive pressure drop at the outlet of a reactor, the secondary reaction zone is preferred to be divided into a front part and a latter part according to the process sequence of the polymerization reaction, and the latter part of the secondary reaction zone may be cross-sectionally larger in area than the primary reaction zone and cross-sectionally smaller in area than the front part of the secondary reaction zone. The length of the front and the latter part of the secondary reaction zone may be varied. However, from the view of pressure drop, the front part has the length of preferably 0.2-2 times, more preferably 0.5-1.5 times as long as the length of the latter part.

In the method for ethylene polymerization of the present invention, the resulted products from the primary reaction zone are continuously fed into the secondary reaction zone at the starting point of the secondary reaction zone, and further an initiator alone or initiator mixture is introduced into the secondary reaction zone at two or more different points of the secondary reaction zone. At least one of the initiator introduced into the secondary reaction zone is preferably a high temperature initiator alone or an initiator mixture containing mainly high temperature initiator.

The high temperature initiator preferably used in the method for ethylene polymerization of the present invention is a compound which can initiate an ethylene polymerization reaction at relatively high temperature such as 190-250° C., including, for example, di-tert-butylperoxide, tert-butyl-cumylperoxide, 1,3-bis(tert-butylperoxy isopropyl)benzene and the like. The high temperature initiator is introduced into the secondary reaction zone, alone or in the form of a mixture with other initiator(s). When the reaction initiating temperature of the high temperature initiator is lower than 190° C., it becomes difficult to control the process. On the other hand, when it is higher than 250° C., the reaction efficiency becomes decreased.

When the high temperature initiator is introduced in the form of a mixture with other initiators such as a low temperature initiator or a mid-temperature initiator, it is preferred that the mixture contains the high temperature initiator in amount of 50 mol %, or more. When the content of the high temperature initiator is less than 50 mol %, the polymerization reaction in the secondary reaction zone becomes unstable. Further, the mixture may or may not contain oxygen, however, a mixture without oxygen is preferred, in terms of stability in operation and process safety.

In the method for ethylene polymerization of the present invention, the initiator, preferably high temperature initiator alone or initiator mixture containing mainly high temperature initiator, is introduced into the secondary reaction zone at two or more different points, preferably three different points of the secondary reaction zone. It is preferred that one of these initiator introduction points of the secondary reaction zone is the starting point of the secondary reaction zone. Such multiple introduction of the initiator in the secondary reaction zone is desirable, from the aspect that it prevents reaction efficiency decrease caused by increase in viscosity of the polymerization system as polymerization reaction proceeds, and improves productivity.

In the method for ethylene polymerization of the present invention, ethylene may be additionally fed into the polymerization reaction zone at one or more points in the polymerization reaction zone excepting the starting point of the primary reaction zone. Preferably, ethylene is additionally fed into the polymerization reaction zone at one or more points in the secondary reaction zone. Such additional feeding of ethylene is desirable, from the aspect that it results in increase in reaction efficiency and improvement in productivity.

Further, in the method for ethylene polymerization of the present invention, ethylene is preferably preheated before being fed into the polymerization reaction zone, so as to raise the reaction efficiency as well as prevent the drastic change of the reaction conditions caused by ethylene feeding.

In other aspect of the present invention, provided is a tubular reactor for continuous type ethylene polymerization under high pressure having a polymerization reaction zone comprising: a primary reaction zone having ethylene feeding part and initiator introduction part at the starting point thereof; and a secondary reaction zone having two or more initiator introduction parts at different points thereof, wherein the secondary reaction zone has the length of 1.5-6.5 times as long as the length of the primary reaction zone and the cross-sectional area of 1.2-4 times as large as the cross-sectional area of the primary reaction zone.

In the tubular reactor of the present invention, for preventing excessive pressure drop at the outlet of the reactor, the secondary reaction zone may be divided into a front part and a latter part, and the latter part of the secondary reaction zone may be cross-sectionally larger in area than the primary reaction zone and cross-sectionally smaller in area than the front part of the secondary reaction zone. The lengths of the front part and the latter part of the secondary reaction zone can be varied. However, from the view of pressure drop, the front part has a length of preferably 0.2-2 times, more preferably 0.5-1.5 times as long as the length of the latter part.

The tubular reactor of the present invention may further comprise one or more additional ethylene feeding parts at one or more different points in the polymerization reaction zone excepting the starting point of the primary reaction zone. The additional ethylene feeding part(s) is preferably located in the secondary reaction zone.

Preferably, the tubular reactor of the present invention may further comprise ethylene preheating part(s), which is connected to the ethylene feeding part(s) and preheats ethylene before feeding into the polymerization reaction zone. In the case of using the preheating part, ethylene passes through the preheating part and then fed into the polymerization reaction zone. The ethylene preheating part may be formed as one unit together with the primary reaction zone. In this case, the ethylene feeding part, which is present at the starting point of the primary reaction zone, becomes the end of the ethylene preheating part, which is formed as one unit together with the primary reaction zone. Otherwise, particularly in the case of additional feeding of ethylene, the ethylene preheating part may be connected from outside to the reactor through a separate connection line.

Other than the above-mentioned components, the tubular reactor according to the present invention may further comprise other various components such as a pressure gauge, a thermometer, a sample collector and the like, which are essentially or optionally included in a reactor for ethylene polymerization, within the range of achieving the purposes of the present invention.

Hereinafter, the present invention is further described in detail in connection with examples given below, however the scope of the present invention is by no means limited by those examples.

EXAMPLES

Example 1

In this example, used was a tubular reactor which comprises, according to the process sequence of the polymerization reaction, an ethylene preheating part having 280 m length, a primary reaction zone having 320 m length and a secondary reaction zone having 1270 m length, wherein the primary reaction zone is a tubular form with an inner diameter of 40 mm having an initiator introduction part 1 at the starting point thereof; and the secondary reaction zone is a tubular form with an inner diameter of 60 mm having an initiator introduction part 2 and an additional ethylene feeding part at the starting point thereof, and the additional ethylene feeding part was connected to an additional ethylene preheating part. The tubular reactor had other two initiator introduction parts 3 and 4 at the points of about 470 m and about 890 m apart from the starting point of the secondary reaction zone, according to the polymerization process direction.

In FIG. 1, the tubular reactor used in the present example 1 was schematically illustrated.

Ethylene was fed into the ethylene preheating part having 280 m length, at the speed of 33.3 ton/hour. Further, ethylene was fed into the additional ethylene preheating part, at the speed of 31.8 ton/hour. A low temperature initiator mixture of 60 mol % of tert-butylperoxy pivalate (TBPV) as a low temperature initiator, 30 mol % of tert-butylperoxy 2-ethylhexanoate (TBPO) as a mid-temperature initiator, and 10 mol % of di-tert-butylperoxide (DTBP) as a high temperature initiator was introduced into the initiator introduction parts 1 and 2. DTBP as a high temperature initiator with the same molar amount as the mixture of the low temperature initiator was introduced into the initiator introduction parts 3 and 4. Ethylene homopolymer was produced.

The conversion rate of the polymerization reaction, pressure at the outlet (the pressure at the end point of the secondary reaction zone), and melt index (MI), density, polydispersity, turbidity and the content of long chain branch (LCB) of the resulted polymer were determined and represented in Table 1 below.

Example 2

In this example, the tubular reactor in above Example 1 was used.

Ethylene was fed at the speed of 38.5 ton/hour and vinyl acetate was fed at the speed of 6900 kg/hour, into the ethylene preheating part having 280 m length. Further, ethylene was fed into the additional ethylene preheating part, at the speed of 36.8 ton/hour. The low temperature initiator mixture and the high temperature initiator were introduced as in Example 1. Ethylene vinyl acetate copolymer was produced.

The conversion rate of the polymerization reaction, pressure at the outlet and the content of vinyl acetate (VA), melt index (MI), polydispersity, turbidity and the content of long chain branch (LCB) of the resulted copolymer were determined and represented in Table 1 below.

Example 3

In this example, used was a tubular reactor which comprises, according to the process sequence of the polymerization reaction, an ethylene preheating part having 280 m length, a primary reaction zone having 320 m length, and the front part of a secondary reaction zone having 470 m length and the latter part of a secondary reaction zone having 800 m length, wherein the primary reaction zone is a tubular form with an inner diameter of 40 mm having an initiator introduction part 1 at the starting point thereof; the front part of the secondary reaction zone is a tubular form with an inner diameter of 60 mm having an initiator introduction part 2 and an additional ethylene feeding part at the starting point thereof and the additional ethylene feeding part was connected to an additional ethylene preheating part; and the latter part of the secondary reaction zone is a tubular form with an inner diameter of 50 mm having an initiator introduction part 3 at the starting point thereof and an initiator introduction part 4 at the point of about 420 m apart from the starting point thereof, toward the polymerization process direction.

Figure 2:
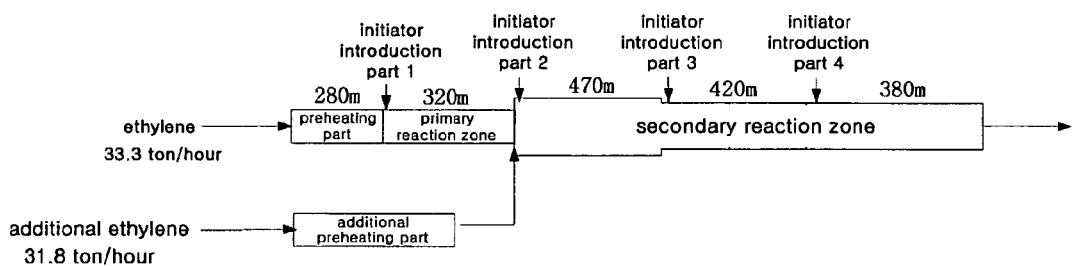
FIG. 2 is a schematic illustration of a tubular reactor used in Example 3 of the present invention.

In FIG. 2, the tubular reactor used in the present example 3 was schematically illustrated.

Ethylene was fed into the ethylene preheating part having 280 m length, at the speed of 33.3 ton/hour. Further, ethylene was fed into the additional ethylene preheating part, at the speed of 31.8 ton/hour. A low temperature initiator mixture of 60 mol % of TBPV as a low temperature initiator, 30 mol % of TBPO as a mid-temperature initiator, and 10 mol % of DTBP as a high temperature initiator was introduced into the initiator introduction parts 1 and 2. DTBP as a high temperature initiator with the same molar amount as the mixture of the low temperature initiator was introduced into the initiator introduction parts 3 and 4. Ethylene homopolymer was produced.

The conversion rate of the polymerization reaction, pressure at the outlet and melt index (MI), density, polydispersity, turbidity and the content of long chain branch (LCB) of the resulted polymers were determined and represented in Table 1 below.

Example 4

In this example, the tubular reactor in above Example 3 was used.

Ethylene was fed at the speed of 38.5 ton/hour and vinyl acetate was fed at the speed of 6817 kg/hour, into the ethylene preheating part having 280 m length. Further, ethylene was fed into the additional ethylene preheating part, at the speed of 36.8 ton/hour. The low temperature initiator mixture and the high temperature initiator were introduced as in Example 3. Ethylene vinyl acetate copolymer was produced.

The conversion rate of the polymerization reaction, pressure at the outlet and the content of vinyl acetate (VA), melt index (MI), polydispersity, turbidity and the content of long chain branch (LCB) of the resulted copolymers were determined and represented in Table 1 below.

Example 5

In this example, the tubular reactor in above Example 3 was used.

Ethylene homopolymer was produced by the same method as in Example 3, except that the high temperature initiator was not introduced into the initiator introduction part 4.

The conversion rate of the polymerization reaction, pressure at the outlet and melt index (MI), density, polydispersity, turbidity and the content of long chain branch (LCB) of the resulted polymers were determined and represented in Table 1 below.

Example 6

In this example 6, used was a tubular reactor which comprises, according to the process sequence of the polymerization reaction, an ethylene preheating part having 280 m length, a primary reaction zone having 320 m length, and a secondary reaction zone having 1270 m length, wherein the primary reaction zone is a tubular form with an inner diameter of 40 mm having an initiator introduction part 1 at the starting point thereof; the secondary reaction zone is a tubular form with an inner diameter of 60 mm having an initiator introduction part 2 and an additional ethylene feeding part 1 at the starting point thereof, and the additional ethylene introduction part 1 is connected to an additional ethylene preheating part 1. The tubular reactor had other initiator introduction parts 3 and 4 at the points of about 470 m and about 890 m apart from the starting point of the secondary reaction zone toward the polymerization process direction, respectively, and an additional ethylene feeding part 2 at the point of about 470 m apart from the starting point of the secondary reaction zone toward the polymerization process direction, and the additional ethylene introduction part 2 was connected to the additional ethylene preheating part 2.

Figure 3:
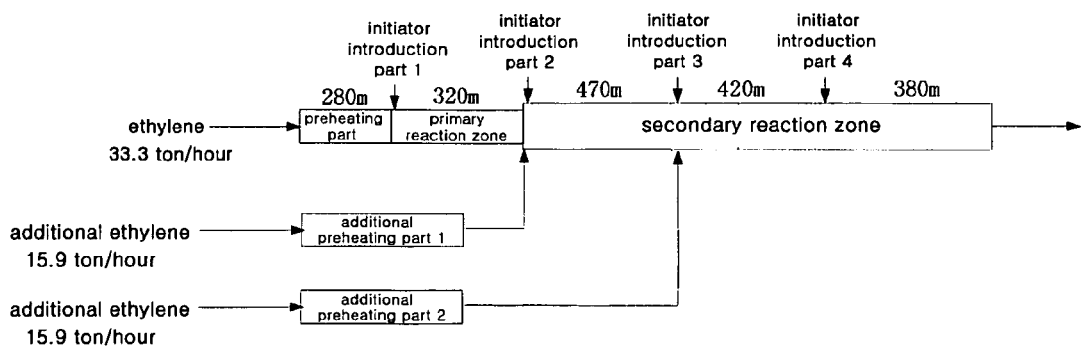
FIG. 3 is a schematic illustration of a tubular reactor used in Example 6 of the present invention.

In FIG. 3, the tubular reactor used in the present example 6 was schematically illustrated.

Ethylene was fed into the ethylene preheating part having 280 m length, at the speed of 33.3 ton/hour. Further, ethylene was fed into the additional ethylene preheating parts 1 and 2, at the speed of 15.9 ton/hour, respectively. A low temperature initiator mixture of 60 mol % of TBPV as a low temperature initiator, 30 mol % of TBPO as a mid-temperature initiator, and 10 mol % of DTBP as a high temperature initiator was introduced into the initiator introduction parts 1, 2 and 3. DTBP as a high temperature initiator with the same molar amount as the mixture of the low temperature initiator was introduced into the initiator introduction part 4. Ethylene homopolymer was produced.

The conversion rate of the polymerization reaction, pressure at the outlet and melt index (MI), density, polydispersity, turbidity and the content of long chain branch (LCB) of the resulted polymer were determined and represented in Table 1 below.

Example 7

In this example, the tubular reactor in above Example 6 was used.

Ethylene was fed at the speed of 38.5 ton/hour and vinyl acetate was fed at the speed of 7283 kg/hour, into the ethylene preheating part having 280 m length. Further, ethylene was fed into the additional ethylene preheating parts 1 and 2 at the speed of 18.4 ton/hour, respectively. The low temperature initiator mixture and the high temperature initiator were introduced as in Example 6. Ethylene vinyl acetate copolymer was produced.

The conversion rate of the polymerization reaction, pressure at the outlet and the content of vinyl acetate (VA), melt index (MI), polydispersity, turbidity and the content of long chain branch (LCB) of the resulted copolymer were determined and represented in Table 1 below.

Example 8

In this example, the tubular reactor in above Example 6 was used.

Ethylene was fed into the ethylene preheating part having 280 m length, at the speed of 33.3 ton/hour. Further, ethylene was fed into the additional ethylene preheating parts 1 and 2 at the speed of 15.9 ton/hour, respectively. A low temperature initiator mixture of 60 mol % of TBPV as a low temperature initiator, 30 mol % of TBPO as a mid-temperature initiator, and 10 mol % of DTBP as a high temperature initiator was introduced into the initiator introduction parts 1, 2 and 3. Ethylene homopolymer was produced.

The conversion rate of the polymerization reaction, pressure at the outlet and melt index (MI), density, polydispersity, turbidity and the content of long chain branch (LCB) of the resulted polymer were determined and represented in Table 1 below.

Example 9

In this example 9, used was a tubular reactor which comprises, according to the process sequence of the polymerization reaction, an ethylene preheating part having 280 m length, a primary reaction zone having 320 m length, the front part of a secondary reaction zone having 470 m length and the latter part of a secondary reaction zone having 800 m length, wherein the primary reaction zone is a tubular form with an inner diameter of 40 mm having an initiator introduction part 1 at the starting point thereof; the front part of the secondary reaction zone is a tubular form with an inner diameter of 60 mm having an initiator introduction part 2 and an additional ethylene feeding part 1 at the starting point thereof, and the additional ethylene feeding part 1 is connected to an additional ethylene preheating part 1; and the latter part of the secondary reaction zone is a tubular form having an inner diameter of 50 mm having an initiator introduction part 3 and an additional ethylene feeding part 2 at the starting point thereof and an initiator introduction part 4 at the point of about 420 m apart from the starting point thereof toward the polymerization process direction, and the additional ethylene feeding part 2 is connected to an additional ethylene preheating part 2.

Figure 4:
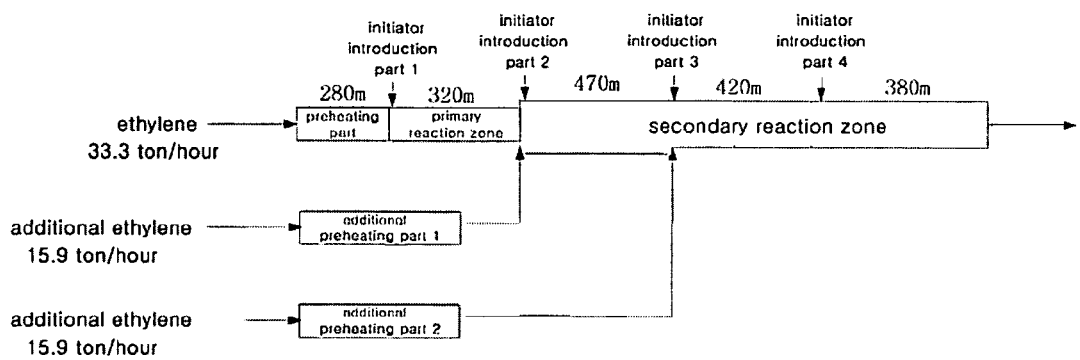
FIG. 4 is a schematic illustration of a tubular reactor used in Example 9 of the present invention.

In FIG. 4, the tubular reactor used in the present example 9 was schematically illustrated.

Ethylene was fed into the ethylene preheating part having 280 m length at the speed of 33.3 ton/hour. Further, ethylene was fed into the additional ethylene preheating parts 1 and 2 at the speed of 15.9 ton/hour, respectively. A low temperature initiator mixture of 60 mol % of TBPV as a low temperature initiator, 30 mol % of TBPO as a mid-temperature initiator, and 10 mol % of DTBP as a high temperature initiator was introduced into the initiator introduction parts 1, 2 and 3. DTBP as a high temperature initiator with the same molar amount as the mixture of the low temperature initiator, was introduced into the initiator introduction part 4. Ethylene homopolymer was produced.

The conversion rate of the polymerization reaction, pressure at the outlet and melt index (MI), density, polydispersity, turbidity and the content of long chain branch (LCB) of the resulted polymer were determined and represented in Table 1 below.

Example 10

In this example, the tubular reactor in above Example 9 was used.

Ethylene was fed at the speed of 38.5 ton/hour and vinyl acetate was fed at the speed of 7250 kg/hour, into the ethylene preheating part having 280 m length. Further, ethylene was fed into the additional ethylene preheating parts 1 and 2 at the speed of 18.4 ton/hour, respectively. The low temperature initiator mixture and the high temperature initiator were introduced as in Example 9. Ethylene vinyl acetate copolymer was produced.

The conversion rate of the polymerization reaction, pressure at the outlet and the content of vinyl acetate (VA), melt index (MI), polydispersity, turbidity and the content of long chain branch (LCB) of the resulted copolymer were determined and represented in Table 1 below.

Comparative Example 1

In this comparative example 1, used was a commercially operated tubular reactor, specifically a tubular reactor which comprises, according to the process sequence of the polymerization reaction, an ethylene preheating part having 360 m length, a primary reaction zone having 710 m length, and a secondary reaction zone having 800 m length, wherein the primary reaction zone is a tubular form with an inner diameter of 40 mm having an initiator introduction part 1 at the starting point thereof; and the secondary reaction zone is a tubular form with an inner diameter of 60 mm having an initiator introduction part 2 and an additional ethylene feeding part at the starting point thereof and an initiator introduction part 3 at the point of about 420 m apart from the starting point of the secondary reaction zone toward the polymerization process direction, and the additional ethylene feeding part is connected to an additional ethylene preheating part.

Figure 5:
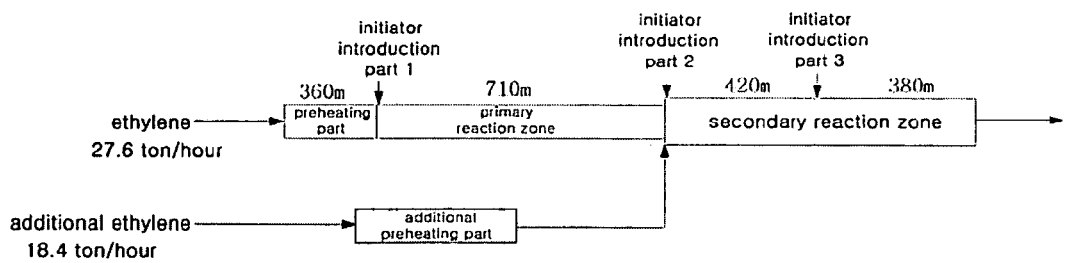
FIG. 5 is a schematic illustration of a tubular reactor used in Comparative Example 1 of the present invention.

In FIG. 5, the tubular reactor used in this comparative example 1 was schematically illustrated.

Ethylene was fed into the ethylene preheating part having 360 m length at the speed of 27.6 ton/hour. Further, ethylene was fed into the additional ethylene preheating part, at the speed of 18.4 ton/hour. A mid-temperature initiator mixture of 6.073 mol % of oxygen, 91 mol % of TBPO as a mid-temperature initiator, and 2.927 mol % of DTBP as a high temperature initiator was introduced into the initiator introduction part 1. A mid-temperature mixture of 0.912 mol % of oxygen, 96 mol % of TBPO as a mid-temperature initiator, 3.088 mol % of DTBP as a high temperature initiator was introduced into the initiator introduction part 2. DTBP as a high temperature initiator with the same molar amount as the mid-temperature initiator mixture was introduced into the initiator introduction part 3. Ethylene homopolymer was produced.

The conversion rate of the polymerization reaction, melt index (MI), density, polydispersity, turbidity and the content of long chain branch (LCB) of the resulted polymer were determined and represented in Table 1 below.

Comparative Example 2

In this example, the tubular reactor in above Comparative Example 1 was used.

Ethylene was fed at the speed of 31.9 ton/hour and vinyl acetate was fed at the speed of 4167 kg/hour, into the ethylene preheating part having 360 m length. Further, ethylene was fed into the additional ethylene preheating part at the speed of 21.3 ton/hour. A mid-temperature initiator mixture of 90 mol % of TBPO as a mid-temperature initiator and 10 mol % of DTBP as a high temperature initiator was introduced into the initiator introduction parts 1 and 2. DTBP as a high temperature initiator with the same molar amount as the mid-temperature initiator mixture, was introduced into the initiator introduction part 3. Ethylene vinyl acetate copolymer was produced.

The conversion rate of the polymerization reaction, the content of vinyl acetate (VA), melt index (MI), polydispersity, turbidity and the content of long chain branch (LCB) of the resulted polymer were determined and represented in Table 1 below.

TABLE 1

|  | Conversion rate (%) | Outlet pressure (kgf/cm² G) | VA content (wt %) | MI (g/10 min) | Density (g/cm³) | poly-dispersity | Turbidity (%) | LCB content (N/1000 C) |
| --- | --- | --- | --- | --- | --- | --- | --- | --- |
| Example 1 | 30.53 | 1447 | — | 1.001 | 0.9244 | 15.53 | 47.38 | 1.1254 |
| Example 2 | 28.92 | 1224 | 13.94 | 2.000 | — | 12.02 | 13.00 | 0.9857 |
| Example 3 | 30.11 | 1646 | — | 1.001 | 0.9246 | 14.16 | 29.32 | 1.0916 |
| Example 4 | 28.56 | 1439 | 14.18 | 1.996 | — | 10.58 | 8.00 | 0.9495 |
| Example 5 | 27.09 | 1686 | — | 1.000 | 0.9251 | 11.75 | 11.74 | 1.0151 |
| Example 6 | 33.27 | 1455 | — | 0.999 | 0.9250 | 17.15 | 78.38 | 1.1653 |
| Example 7 | 30.57 | 1298 | 14.03 | 2.002 | — | 12.01 | 12.97 | 0.9989 |
| Example 8 | 30.97 | 1499 | — | 1.001 | 0.9255 | 14.89 | 38.08 | 1.1031 |
| Example 9 | 33.16 | 1578 | — | 1.000 | 0.9252 | 15.76 | 51.20 | 1.1348 |
| Example 10 | 30.42 | 1429 | 14.27 | 1.998 | — | 10.93 | 8.87 | 0.9699 |
| Com. example 1 | 27.65 | 2018 | — | 1.000 | 0.9254 | 11.98 | 12.79 | 1.0269 |
| Com. example 2 | 24.80 | 1876 | 14.72 | 2.001 | — | 8.27 | 5.92 | 0.8813 |

Note) vinyl acetate(VA) content: measured by IR spectrometer, according to ASTM D5576.
Melt index (MI): measured according to ASTM D1238(190° C., 2.16 kg load).
Polydispersity: measured by Gel permeation chromatography(GPC) according to ASTM D5296.
Turbidity: measured by ASTM D1003.
Long chain branch(LCB) content: measured by NMR.

From the above table 1, when the conversion rate (%)/100 is multiplied by the total amount of ethylene fed per hour, the resulted value means the production amount of polymers per hour, in other words, production rate. The higher the production rate is, the higher productivity is improved. The conversion rates, the total amounts of ethylene fed per hour and productivities of examples and comparative examples were given in Table 2 below.

TABLE 2

|  | Conversion rate (%) | Total amount of ethylene fed per hour (ton/hour) | Production rate (ton/hour) |
| --- | --- | --- | --- |
| Example 1 | 30.53 | 65.1 | 19.88 |
| Example 2 | 28.92 | 75.3 | 21.78 |
| Example 3 | 30.11 | 65.1 | 19.60 |
| Example 4 | 28.56 | 75.3 | 21.51 |
| Example 5 | 27.09 | 65.1 | 17.64 |
| Example 6 | 33.27 | 65.1 | 21.66 |
| Example 7 | 30.57 | 75.3 | 23.02 |
| Example 8 | 30.97 | 65.1 | 20.16 |
| Example 9 | 33.16 | 65.1 | 21.59 |
| Example 10 | 30.42 | 75.3 | 22.91 |
| Com. example 1 | 27.65 | 46 | 12.72 |
| Com. example 2 | 24.80 | 53.2 | 13.19 |

As seen from the above Table 2, the examples of the present invention which practiced the method of the present invention by using a tubular reactor according to the present invention, showed higher production rates and eventually improved productivity, as compared to the comparative examples which used a commercially operated tubular reactor. Further, from the above Table 1, it can be known that polymers which have physical properties such as polydispersity referring to molecular weight distribution, turbidity and LCB content variously while maintaining MI and density stable, can be prepared by modifying the cross-sectional area of a tube constituting each reaction zone of the present invention, or varying the types of initiators and the number of times of introduction thereof, or feeding additional ethylene.

INDUSTRIAL APPLICABILITY

As described so far, the present invention can provide ethylene homopolymers or copolymers having physical properties variously, with high productivity.

What is claimed is:

1. A method for continuous ethylene polymerization using a polymerization reaction zone comprising a primary reaction zone and a secondary reaction zone according to the process sequence of the polymerization reaction, wherein the secondary reaction zone has the length of 1.5-6.5 times as long as the length of the primary reaction zone and the cross-sectional area of 1.2-4 times as large as the cross-sectional area of the primary reaction zone, and wherein ethylene is fed continuously into the primary reaction zone at the starting point of the primary reaction zone, low temperature initiator alone or initiator mixture containing mainly low temperature initiator is introduced into the primary reaction zone at the starting point of the primary reaction zone, and initiator alone or initiator mixture is introduced into the secondary reaction zone at two or more different points of the secondary reaction zone.

2. The method according to claim 1, wherein the low temperature initiator is a compound which can initiate ethylene polymerization reaction at 140-160° C.

3. The method according to claim 1, wherein the initiator mixture containing mainly low temperature initiator comprises 50 mol % or more of the low temperature initiator and does not comprise oxygen.

4. The method according to claim 1, wherein the secondary reaction zone is divided into a front part and a latter part, and the latter part of the secondary reaction zone is cross-sectionally larger in area than the primary reaction zone and cross-sectionally smaller in area than the front part of the secondary reaction zone.

5. The method according to claim 1, wherein at least one of the initiator introduced into the secondary reaction zone is a high temperature initiator alone or an initiator mixture containing mainly high temperature initiator.

6. The method according to claim 5, wherein the high temperature initiator is a compound, which can initiate an ethylene polymerization reaction at 190-250° C.

7. The method according to claim 5, wherein the initiator mixture containing mainly high temperature initiator comprises 50 mol % or more of the high temperature initiator, and does not comprise oxygen.

8. The method according to claim 1, wherein ethylene is additionally fed into the polymerization reaction zone at one or more different points of the polymerization reaction zone excepting the starting point of the primary reaction zone.

9. The method according to claim 8, wherein ethylene is additionally fed into the polymerization reaction zone at one or more points of the secondary reaction zone.

10. The method according to claim 1, wherein ethylene is preheated before being fed into the polymerization reaction zone.

11. The method according to claim 8, wherein ethylene is preheated before being fed into the polymerization reaction zone.

12. A tubular reactor for continuous ethylene polymerization having a polymerization reaction zone comprising:
   a primary reaction zone having ethylene feeding part and initiator introduction part at the starting point thereof; and
   a secondary reaction zone having two or more initiator introduction parts at different points thereof,
   wherein the secondary reaction zone has the length of 1.5-6.5 times as long as the length of the primary reaction zone and the cross-sectional area of 1.2-4 times as large as the cross-sectional area of the primary reaction zone.

13. The tubular reactor according to claim 12, wherein the secondary reaction zone is divided into a front part and a latter part, and the latter part of the secondary reaction zone is cross-sectionally larger in area than the primary reaction zone and cross-sectionally smaller in area than the front part of the secondary reaction zone.

14. The tubular reactor according to claim 12, further comprising one or more additional ethylene feeding parts at one or more different points in the polymerization reaction zone excepting the starting point of the primary reaction zone.

15. The tubular reactor according to claim 14, wherein the secondary reaction zone comprises the additional ethylene feeding part(s).

16. The tubular reactor according to claim 12, further comprising ethylene preheating part(s) which is connected to the ethylene feeding part(s).

17. The tubular reactor according to claim 14, further comprising ethylene preheating part(s) which is connected to the ethylene feeding part(s).

* * * * *